US008249022B2

(12) United States Patent
Dalsgaard et al.

(10) Patent No.: US 8,249,022 B2
(45) Date of Patent: Aug. 21, 2012

(54) CHANNEL ALLOCATION WHEN USING MEASUREMENT GAPS WITH H-ARQ

(75) Inventors: Lars Dalsgaard, Oulu (FI); Frank Frederiksen, Klarup (DK); Troels Emil Kolding, Klarup (DK)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 12/811,278

(22) PCT Filed: Jan. 4, 2008

(86) PCT No.: PCT/IB2008/000013
§ 371 (c)(1),
(2), (4) Date: Jun. 30, 2010

(87) PCT Pub. No.: WO2009/087429
PCT Pub. Date: Jul. 16, 2009

(65) Prior Publication Data
US 2010/0284360 A1    Nov. 11, 2010

(51) Int. Cl.
*H04W 72/00*    (2009.01)
(52) U.S. Cl. .......................... 370/331; 370/329; 370/347
(58) Field of Classification Search .................. 370/331, 370/328, 347
See application file for complete search history.

(56) References Cited

U.S. PATENT DOCUMENTS

| 2005/0041618 A1* | 2/2005 | Wei et al. ........................ 370/328 |
| 2007/0019608 A1* | 1/2007 | Padovani et al. .............. 370/347 |
| 2007/0237248 A1* | 10/2007 | Jung et al. ...................... 375/260 |
| 2008/0083013 A1* | 4/2008 | Soliman et al. ................... 726/1 |

FOREIGN PATENT DOCUMENTS

| EP | 1 565 023 A2 | 8/2005 |
| WO | WO 2005/109725 A1 | 11/2005 |

OTHER PUBLICATIONS

3GPP TSG-RAN2 Meeting #60, R2-075484, Jeju, South Korea, Nov. 5-9, 2007, 36.300 CR 006, Rev. 8.2.0, 115 pgs.

* cited by examiner

*Primary Examiner* — Dang Ton
*Assistant Examiner* — Pamit Kaur
(74) *Attorney, Agent, or Firm* — Harrington & Smith

(57) ABSTRACT

A user equipment (UE) receives a first dynamic resource allocation on a first channel (PDCCH), then sends data according to the first resource allocation. During a time at which an ACK/NACK for the sent data is scheduled to occur on a second channel (PHICH), the UE is engaging in an activity that takes priority over the ACK/NACK. The UE then receives a second dynamic resource allocation on the first channel and determines the ACK/NACK for the sent data from the second dynamic resource allocation. The determining can be direct, as in receiving a zero-valued resource allocation; or it may be indirect as in mapping the second dynamic resource allocation to the second channel and receiving the acknowledgement on the second channel after that mapping. Also detailed are similar mirror actions from the Node B's perspective, as well as apparatus, methods, and embodied computer programs.

34 Claims, 3 Drawing Sheets

CHANNEL ALLOCATION WHEN USING MEASUREMENT GAPS WITH H-ARQ

TECHNICAL FIELD

The exemplary and non-limiting embodiments of this invention relate generally to wireless communication systems, methods, devices and computer program products and, more specifically, relate to automatic repeat-request allocations in a dynamic scheduling environment.

BACKGROUND

Following are some acronyms used in the description of the invention:
3GPP third generation partnership project
CCE connection control entity
DL downlink
eNB. evolved Node B (base station of an LTE network)
E-UTRAN evolved universal terrestrial radio access network.
FDD frequency division duplex
H-ARQ hybrid automatic repeat request
LTE long term evolution (also known as E-UTRAN or 3.9G)
PHICH physical H-ARQ indicator channel
PDCCH physical downlink control channel
PRB physical resource block
TDD time division duplex
TTI transmission time interval
UE user equipment
UL uplink Relevant to these teachings is the H-ARQ behaviour in connection to measurement gaps. One of the central features of LTE is the usage of fast hybrid automatic repeat request (H-ARQ), which is used to increase the spectral efficiency. The normal H-ARQ operation for dynamic scheduled uplink data is that that for each uplink resource grant [which is signalled on the downlink control channel (PDCCH)], there will be an associated H-ARQ feedback channel for positive (ACK) and negative (NAK or NACK) acknowledgements. In the current understanding in 3GPP, there will be a delay between the time of the uplink grant (which is sent on the PDCCH) to the time where the UE will actually transmit uplink data, and a further delay to the time where the eNB should send the ACK/NACK on the PHICH (physical H-ARQ indication channel). The current assumption is that the scheduling delay will be 3 ms (plus the delay of the actual signalling on the PDCCH), and that the eNB processing time will also be 3 ms. This means that the timing relation for a single H-ARQ process or channel will be (by example) according to the following sequential TTIs:
TTI#0: UL allocation grant is sent on the PDCCH.
TTI#4: UL data transmission from the UE on the granted UL resource.
TTI#8: ACK/NACK is sent on the PHICH [or a dynamic scheduling for a retransmission on the PDCCH in the case of adaptive H-ARQ].

Consider the case where non-adaptive H-ARQ is used for the uplink (meaning that uplink retransmissions are performed on the same physical resources, and the UE only needs an indication of whether it should do a retransmission in the uplink). This is handled through PHICH signalling, where under current understanding in 3GPP the UE will be assigned a PHICH resource through its 'allocation order', which for instance could be related to the CCE index used for the indication of the resource allocation (TTI #0 in the above sequence). Another method is to relate the allocation order to the assigned uplink physical resources combined with additional signalling to indicate an offset relative to the first PRB index of the allocated physical resources.

In the RAN4 group of 3GPP development, discussions are currently ongoing as to when and how to allow for the UE to do measurements (including cell identification and signal level measurements) related to handover. It is understood that the UE needs to do cell identification and additionally some measurements of the channel (i.e., some measure of channel quality such as signal strength) with neighboring eNBs to be prepared for handover from one eNB to another. This is termed in 3GPP a measurement gap, the time at which the UE is performing cell identification of surrounding cells (inter-frequency or inter-radio access technology RAT) and taking measurements in order to report same (generally for handover purposes but they may also be imposed by the eNB for network configuration or testing or other more routine purposes). This measurement gap will occur at time instants that are coordinated between the eNB and the UE. But it is clear that these measurement gaps will influence or break the H-ARQ timing relationships.

The current agreement on this matter in 3GPP is captured in the latest changes to E-UTRAN stage 2 specification 36.300, which can be seen at document R2-075484 (Change Request, 3GPP TSGRAN2 Meeting #60, Jeju, South Korea, 5-9 Nov. 2007 by Nokia Siemens Networks):

Measurement gaps are of higher priority than H-ARQ retransmissions: whenever an H-ARQ retransmission collides with a measurement gap, the H-ARQ retransmission does not take place.

As such, there is an awareness that these measurement gaps will occur and conflict with H-ARQ communications, and it is determined that where there is a H-ARQ transmission to take place while the UE is within a measurement gap, the H-ARQ transmission will not take place. This is a simple implementation because the eNB knows the measurement gap (and generally commands it of the UE) and the eNB also knows when it is to send the ACK/NACK to that same UE, so the eNB simply foregoes sending its ACK or NACK to the UE according to the above priority decision agreed for LTE.

This agreement basically means that a measurement gap is truly a gap in which the eNB cannot expect the UE to receive any DL information, including PDCCH or transmit any information in UL including H-ARQ ACKs and NACKs.

The inventors are unaware of any solution proposed by another. One straightforward option that avoids the problem is to equip the UEs with two transmitters and two receivers. But apart from increasing costs of UEs and failing to account for legacy UEs already in use that do not have such dual transceiver capacity, the design of such a UE is not a simple matter as simultaneous transmission and reception to/from the same device, using frequency division to divide the signals, can raise interference problems internally within the UE.

What is needed is a way to enable H-ARQ where the normal H-ARQ timing would occur within a measurement gap and without waiting so long as to make the H-ARQ effectively worthless (e.g., interpreted as non-reception due to the passage of a threshold time period).

SUMMARY

According to an embodiment of the invention is a method that includes receiving a first dynamic resource allocation on a first channel and sending data according to the first resource allocation. During a time at which an acknowledgement or negative acknowledgement for the sent data is scheduled to occur on a second channel, the method includes engaging in a priority activity that takes priority over the acknowledgement or negative acknowledgement, and thereafter receiving a second dynamic resource allocation on the first channel and determining the acknowledgement or negative acknowledgement for the sent data from the second dynamic resource allocation. The determining can be direct, as in receiving a zero-valued resource allocation; or it may be indirect as in mapping the second dynamic resource allocation to the second channel and receiving the acknowledgement on the second channel after that mapping.

According to another embodiment of the invention is a computer readable memory embodying a program of machine-readable instructions executable by a digital data processor to perform actions directed toward scheduling an acknowledgment. In this embodiment the steps include sending data according to the first resource allocation in response to receiving a first dynamic resource allocation on a first channel, and engaging in a priority activity that takes priority over the acknowledgement or negative acknowledgement during a time at which an acknowledgement or negative acknowledgement for the sent data is scheduled to occur on a second channel. A further step includes determining the acknowledgement or negative acknowledgement for the sent data from a second dynamic resource allocation in response to receiving the second dynamic resource allocation on the first channel.

According to another embodiment of the invention is an apparatus that includes a receiver, a transmitter and a processor. The receiver is configured to receive a first dynamic resource allocation on a first channel, and the transmitter is configured to send data according to the first resource allocation. The processor is configured to control at least the receiver, during a time at which an acknowledgement or negative acknowledgement for the sent data is scheduled to be received on a second channel, to engage in a priority activity that takes priority over receiving the acknowledgement or negative acknowledgement. The receiver is further configured thereafter to receive a second dynamic resource allocation on the first channel and to determine the acknowledgement or negative acknowledgement for the sent data from the second dynamic resource allocation.

According to another embodiment of the invention is an apparatus that includes receiver means, transmit means, and processing means. The receiver means is for receiving a first dynamic resource allocation on a first channel and the transmit means is for sending data according to the first resource allocation. The processing means is for controlling at least the receiver means, during a time at which an acknowledgement or negative acknowledgement for the sent data is scheduled to be received on a second channel, to engage in a priority activity that takes priority over receiving the acknowledgement or negative acknowledgement. The receiver means is further for receiving a second dynamic resource allocation on the first channel and the processor is further for determining the acknowledgement or negative acknowledgement for the sent data from the second dynamic resource allocation. In a particular embodiment, the receiver means is a receiver, the transmit means is a transmitter and the processing means is a digital data processor, and further the first channel is a physical downlink control channel, the second channel is a physical H-ARQ indicator channel, and the processing means is configured to map the first dynamic resource allocation to the second channel according to a first index sequence of the first dynamic resource allocation and to map the second dynamic resource allocation to the second channel according to a second index sequence of the second dynamic resource allocation, where in an embodiment the second index sequence is mapped using a received offset.

According to another embodiment of the invention is a method that includes sending to a user equipment a first dynamic resource allocation on a first channel, receiving or not receiving data correctly from the user equipment according to the first resource allocation, and determining that, during a time at which an acknowledgement or negative acknowledgement for the respective received or not received data is scheduled to be sent to the user equipment on a second channel, the user equipment is engaging in a priority activity that takes priority over receiving the acknowledgement or negative acknowledgement. Further in the method is sending to the user equipment a second dynamic resource allocation on the first channel that comprises information from which the user equipment can determine the acknowledgement or negative acknowledgement for the respective received or not received data.

According to another embodiment of the invention is an apparatus that includes a transmitter, a receiver and a processor. The transmitter is configured to send to a user equipment a first dynamic resource allocation on a first channel and the receiver is configured to correctly receive data from the user equipment according to the first resource allocation. The processor is configured to determine that, during a time at which an acknowledgement for the correctly received data is scheduled to be sent to the user equipment on a second channel, the user equipment is engaging in a priority activity that takes priority over receiving the acknowledgement or negative acknowledgement. Further, the transmitter is configured to thereafter send to the user equipment a second dynamic resource allocation on the first channel that comprises information from which the user equipment can determine the acknowledgement for the received data according to the second dynamic resource allocation.

These and other aspects of the invention are detailed with more particularity below.

DETAILED DESCRIPTION

Figure 1:
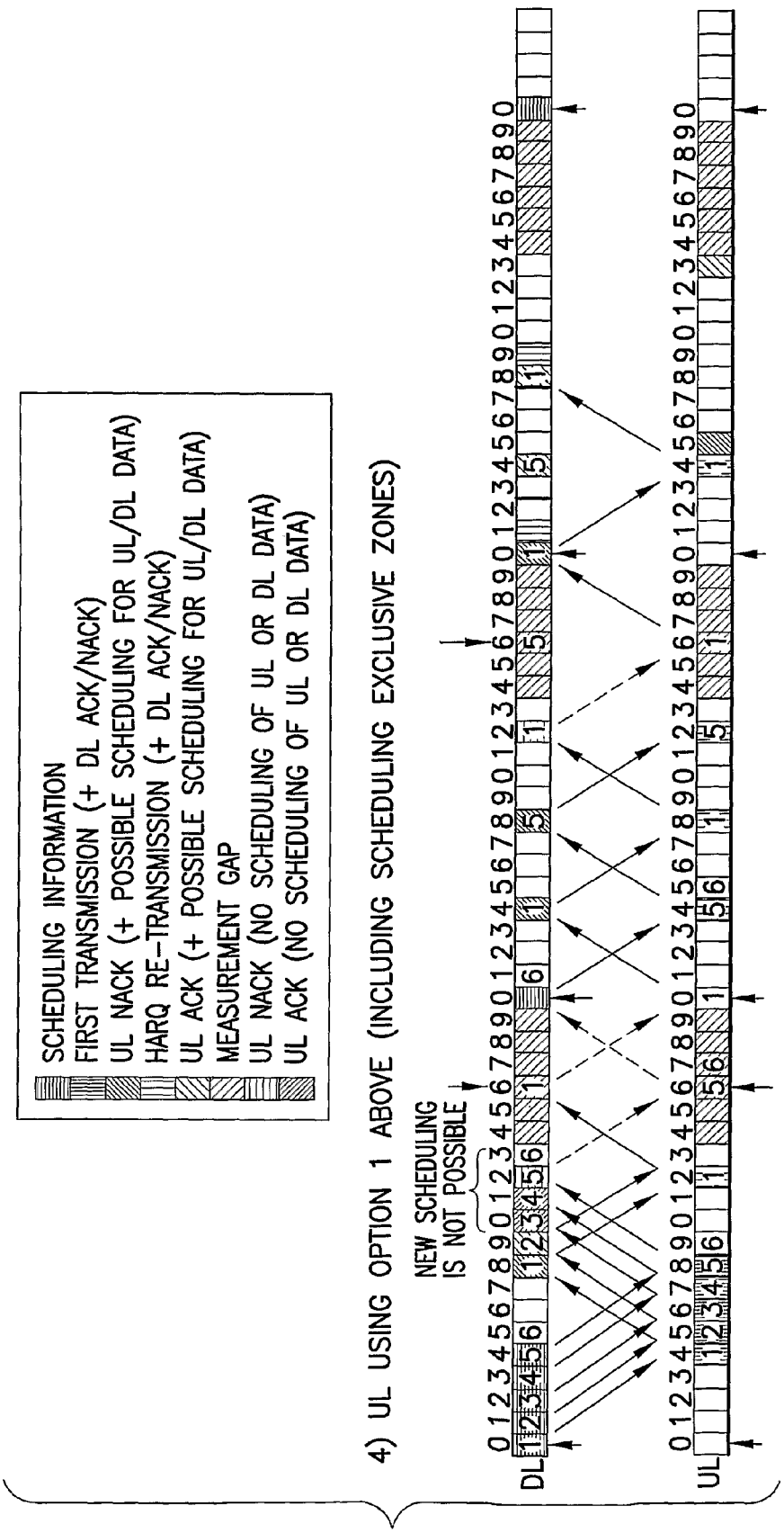
FIG. 1 is a schematic representation of uplink and downlink time slots aligned with one another and showing various communications to illustrate the problem that arises from measurement gaps where H-ARQ timing depends from dynamic resource allocations.

As noted above, aspects of this invention are particularly advantageous to the concept creation for the long term evolution (LTE) of 3GPP. These teachings are seen as particularly valuable for the LTE FDD mode of operation, but could also be applied to the TDD mode as well. In an embodiment the invention is to have a configuration rule, preferably defined in the wireless access specifications, which defines the default UE and eNB behaviour concerning the H-ARQ operation and measurement gaps. An important consideration in formulating the solution is that whenever a UE is transmitting data at a time instant where it will not be possible for the UE to receive the H-ARQ information on the PHICH, it will lose the PHICH allocation, and can only receive H-ARQ related information through a new UL resource allocation. Said another way, a first mapping from the first allocation on the PDCCH to the PHICH is no longer valid if the UE is unable to receive an ACK/NACK when scheduled, so we cannot simply have the UE listen for the ACK/NACK at another time apart from the scheduled time given by the index mapping from the original PDCCH allocation. The H-ARQ information in embodiments of this invention is to be conveyed by the dynamic allocations on the PDCCH, where a negative acknowledgement is indicated by a redundancy version (of the original NACK that the UE could not receive) telling the UE that a retransmission is expected, while the positive acknowledgement is indicated by allocating/granting resources for a redundancy version indicating a new transmission (of an ACK on the PHICH mapped by the new PDCCH allocation). If a UE is not to be granted any new resources, a positive acknowledgement could be indicated to the UE by allocating a zero-valued resource. This special allocation grant could be for instance through allocating zero physical resources or by assigning a transport block size of zero to the UE for transmission, while at the same time indicating that the UE should send new data (through the use of a new data indicator).

To more clearly illustrate the invention described above, consider FIG. 1. The upper line/set of blocks indicating the downlink transmission of uplink resource grants on the PDCCH. The lower line/set of blocks indicates the corresponding uplink transmissions. Each block represents a 1 ms time slot or TTI and the blocks are aligned in time between the top and bottom lines/rows. Numbering above the blocks indicates an index and numbering in the blocks indicates a specific H-ARQ process, so number "1" for example at DL slot 0 is sent as a UL allocation to the UE which then sends its data "1" at UL TTI#4 according to that UL allocation. The same "1" within a block through the diagram indicates the same H-ARQ process.

It is seen that there is a delay of 3 ms from the UE reception of an allocation to the actual transmission of the uplink data. Following the transmission (which takes 1 ms), there is a further delay of 3 ms (for eNB reception and processing) until an ACK/NACK or dynamic uplink allocation can take place. Further, in FIG. 1 it is seen that there are some measurement gaps (indicated with orange fields), where the UE will not be able to receive or transmit.

Now, consider that the allocation of an uplink transmission for H-ARQ process #1 (UL allocation sent at DL TTI#0 of FIG. 1). The uplink transmission of data will happen in UL TTI#4, and the ACK/NACK indication on the PHICH will happen in DL TTI #8. Now, consider the case where a new uplink allocation is granted/signalled in DL TTI #8. The uplink data transmission for that new uplink allocation will happen in UL TTI #12. However, as seen in FIG. 1, it will not be possible for the UE to receive indications on the H-ARQ status during the measurement gap which spans TTI#s 14-19. Further, as the allocation of PHICH resources are connected to the "allocation order" of the PDCCH, the UE will not be able to maintain this information for later time instants, and will have to rely on the dynamic allocations for subsequent retransmissions after the measurement gap. Any ACK/NACK for that H-ARQ process #1 that takes place after then next PDCCH is sent can no longer use the PDCCH to PHICH mapping of the original PDCCH, it has expired.

So from the UE's perspective, the UE receives a first dynamic resource allocation on a first channel PDCCH, then sends data according to the first resource allocation. During a time at which an ACK or NACK for the sent data is scheduled to occur on a second channel PHICH, the UE engages in a priority activity such as the neighbor cell measuring and/or reporting that is priority over the ACK/NACK as stipulated in background above. The UE therefore cannot receive the ACK/NACK for the sent data as normal, so it receives a second dynamic resource allocation on the first channel PDCCH, and receives the ACK or NACK for the sent data according to the second dynamic resource allocation which, due to the different order of indexes in the second PDCCH, maps to the PHICH differently than the original PDCCH did.

From the eNB's perspective, the eNB sends to a UE a first dynamic resource allocation on a first channel PDCCH, then either receives or does not receive from the UE data according to the first resource allocation. During a time at which an ACK or NACK for the respective received or not received data is scheduled to be sent on a second channel PHICH, the eNB determines that the UE is engaged in a priority activity such as the neighbor cell measuring and/or reporting that is priority over the ACK/NACK as stipulated in background above. The eNB recognizes from the determination that the UE cannot receive the ACK/NACK from the eNB for the data as normal, so it sends to the UE a second dynamic resource allocation on the first channel PDCCH, and sends the ACK or NACK respecting the sent data according to the second dynamic resource allocation PDCCH which, due to the different order of indexes in the second PDCCH, maps to the PHICH differently than the original PDCCH did.

Figure 2:
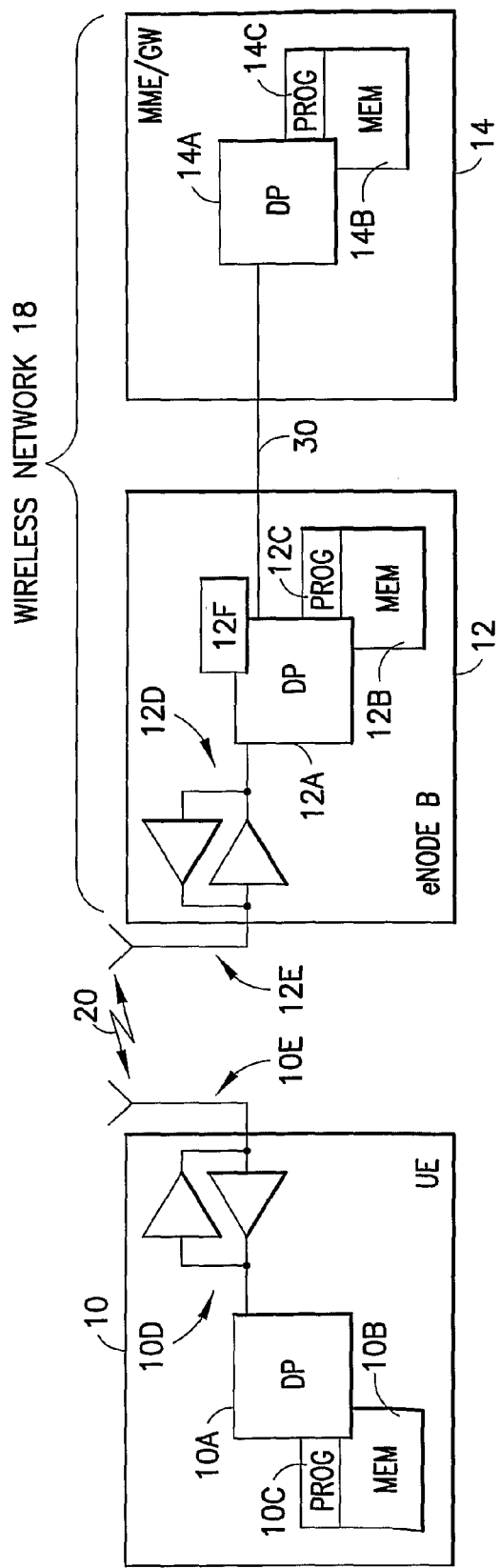
FIG. 2 is a schematic representation of a user equipment and elements of a wireless access network that may be used to implement the invention.

Reference is now made to FIG. 2 for illustrating a simplified block diagram of various electronic devices that are suitable for use in practicing the exemplary embodiments of this invention. In FIG. 2 a wireless network 18 is adapted for communication between a UE 10 and a Node B 12 (e-Node B). The network 18 may include a gateway GW/serving mobility entity MME/radio network controller RNC 14 or other radio controller function known by various terms in different wireless communication systems. The UE 10 includes a data processor (DP) 10A, a memory (MEM) 10B that stores a program (PROG) 100, and a suitable radio frequency (RF) transceiver 10D coupled to one or more antennas 10E (one shown) for bidirectional wireless communications over one or more wireless links 20 with the Node B 12.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The Node B 12 also includes a DP 12A, a MEM 12B, that stores a PROG 12C, and a suitable RF transceiver 12D coupled to one or more antennas 12E. The Node B 12 may be coupled via a data path 30 (e.g., Iub or S1 interface) to the serving or other GW/MME/RNC 14. The GW/MME/RNC 14 includes a DP 14A, a MEM 14B that stores a PROG 140, and a suitable modem and/or transceiver (not shown) for communication with the Node B 12 over the Iub link 30.

Also within the node B 12 is a scheduler 12F that schedule the various UEs under its control for the various UL and DL subframes/slots/TTIs. Once scheduled, the Node B sends messages to the UEs with the scheduling grants (typically multiplexing grants for multiple UEs in one message). These grants are sent over the particular channels noted with the specific embodiments detailed above. Generally, the Node B 12 of an LTE system is fairly autonomous in its scheduling and need not coordinate with the GW/MME 14 excepting during handover of one of its UEs to another Node B.

At least one of the PROGs 100, 12C and 14C is assumed to include program instructions that, when executed by the associated DP, enable the electronic device to operate in accordance with the exemplary embodiments of this invention, as detailed above. Inherent in the DPs 10A, 12A, and 14A is a clock to enable synchronism among the various apparatus for transmissions and receptions within the appropriate time intervals and slots required, as the scheduling grants and the granted resources/subframes are time dependent.

The PROGs 10C, 12C, 14C may be embodied in software, firmware and/or hardware, as is appropriate. In general, the exemplary embodiments of this invention may be implemented by computer software stored in the MEM 10B and executable by the DP 10A of the UE 10 and similar for the other MEM 12B and DP 12A of the Node B 12, or by hardware, or by a combination of software and/or firmware and hardware in any or all of the devices shown.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

For the aspects of this invention related to the Node B 12, embodiments of this invention may be implemented by computer software executable by a data processor of the Node B 12, such as the processor 12A shown, or by hardware, or by a combination of software and hardware. For the aspects of this invention related to UE 10, embodiments of this invention may be implemented by computer software executable by a data processor of the UE 10, such as the processor 10A shown, or by hardware, or by a combination of software and hardware. Further in this regard it should be noted that the various logical step descriptions above may represent program steps, or interconnected logic circuits, blocks and functions, or a combination of program steps and logic circuits, blocks and functions.

Figure 3:
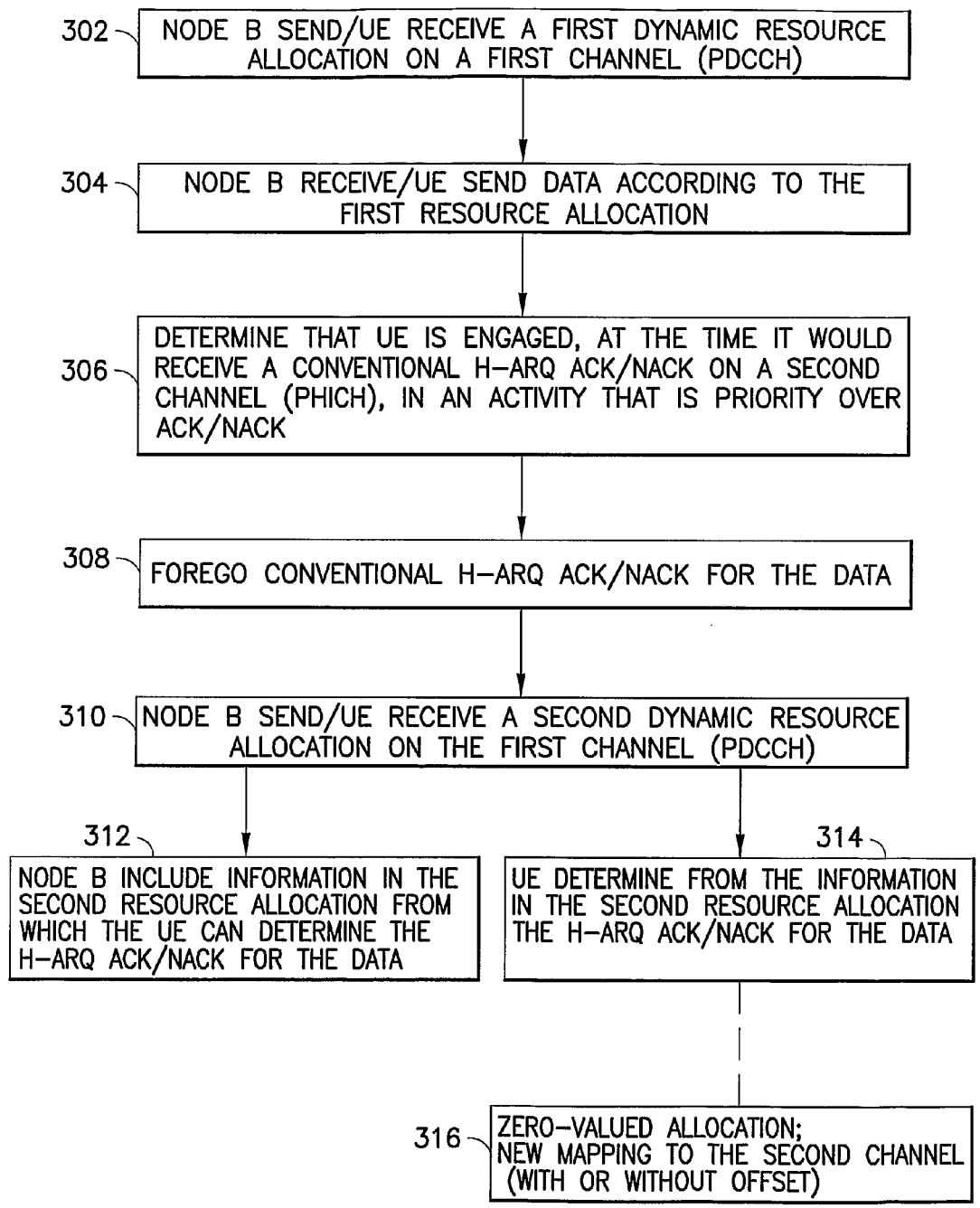
FIG. 3 is a flowchart showing process steps according to embodiments of the invention from both the UE and the Node B perspective.

FIG. 3 illustrates some general process steps according to embodiments of the invention, showing it from both the UE's and Node B's perspective. At block 302 the Node B sends and the UE receives a first dynamic resource allocation on the PDCCH, and consequently the Node B receives (or not receives in the case of a NACK) the data sent by the UE according to the resource allocation of block 302. At block 306 the Node B determines that the UE is engaged in some other activity that takes priority over receiving a conventional H-ARQ ACK/NACK, such as for example measuring or reporting a channel or measuring a neighbor cell. The UE of course knows that it is engaged in the priority activity and does nothing different, but the Node B may forego at block 308 sending the conventional H-ARQ ACK/NACK. Instead, at block 310 the node B sends and the UE receives a second dynamic resource allocation on the PDCCH. At block 312, it is seen that in the second dynamic resource allocation the Node B included information by which the UE will be able to determine the H-ARQ ACK/NACK. At block 314 the UE determines from that information the H-ARQ ACK/NACK for the data it sent at block 304. Block 316 lists two different types of such information.

An example of the case where the UE determines the H-ARQ ACK/NACK directly from the second resource allocation is that the second resource allocation includes a zero-valued radio resource. The UE recognizes that as an ACK. There may of course be other non-zero allocations for that same UE, but a particular (e.g., the first allocation to that UE) allocation being zero'd out indicates to the UE an ACK, apart from the conventional ACK signaled on time on the PHICH but forgone at block 308. An example of the case where the UE determines the H-ARQ ACK/NACK indirectly from the second resource allocation is that the UE maps the index sequence of the second allocation to the allocated resources, and one of the resources allocated to the UE by that mapping is the PHICH (in the case of an ACK), in which case the UE tunes to it and receives the ACK. The UE recognizes that since it was engaged in a priority activity at block 306 when the conventional ACK should have been sent (but may not have been at block 308, the UE has no way of knowing) then this ACK must relate to the data sent at block 204. The Node B may send to the UE an offset that it uses to map the index to the resources when the conditions of block 306 are satisfied, and the offset causes the index to map to the PHICH. These examples are summarized at block 316.

The invention involves or is related to cooperation between elements of a communication system. Examples of a wireless communication system include implementations of E-UTRAN, though the concepts presented by example herein may be extended to other systems such as GSM (Global System for Mobile Communication) and UMTS (Universal Mobile Telecommunication System) and others. The illustrated elements of the communication system are exemplary only and does not bind, limit or restrict the invention in any way to only these elements of the communication systems since the invention is no limited only to E-UTRAN.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

We claim:

1. A method comprising:
   receiving a first dynamic resource allocation on a first channel from a network node;
   sending to the network node data according to the first resource allocation;
   during a time at which an acknowledgement or negative acknowledgement for the sent data is scheduled to occur on a second channel, engaging in a priority activity that takes priority over receiving the acknowledgement or negative acknowledgement;
   receiving a second dynamic resource allocation on the first channel from the network node; and
   determining the acknowledgement or negative acknowledgement for the sent data from the received second dynamic resource allocation.

2. The method of claim 1, wherein the first channel is a physical downlink control channel and the second channel is a physical H-ARQ indicator channel.

3. The method of claim 1, wherein the received second dynamic resource allocation further comprises an uplink resource allocation.

4. The method of claim 3, wherein the acknowledgement comprises an allocation of a zero-valued radio resource in the second dynamic resource allocation.

5. The method of claim 1, wherein the received first dynamic resource allocation maps to the second channel according to a first index sequence of the received first dynamic resource allocation and the received second dynamic resource allocation maps to the second channel according to a second index sequence of the received second dynamic resource allocation.

6. The method of claim 5, wherein determining the acknowledgement or negative acknowledgement comprises mapping the received second dynamic resource allocation to the second channel using a received offset of the second index sequence.

7. The method of claim 1, wherein the priority activity comprises at least one of measuring channel quality of the first channel with a second network node that is a neighbor to the first network node, reporting channel quality of the first channel with the second network node, and cell identification of a surrounding cell.

8. The method of claim 1 executed by a user equipment in an E-UTRAN network.

9. A computer readable memory embodying a program of machine-readable instructions executable by a digital data processor to perform actions directed toward scheduling an acknowledgment, the steps comprising:
   responsive to receiving a first dynamic resource allocation on a first channel from a network node, sending to the network node data according to the first resource allocation;
   during a time at which an acknowledgement or negative acknowledgement for the sent data is scheduled to occur on a second channel, engaging in a priority activity that takes priority over receiving the acknowledgement or negative acknowledgement; and
   responsive to receiving a second dynamic resource allocation on the first channel from the network node, determining the acknowledgement or negative acknowledgement for the sent data from the received second dynamic resource allocation.

10. The computer readable memory of claim 9, wherein the first channel is a physical downlink control channel and the second channel is a physical H-ARQ indicator channel, and wherein the received first dynamic resource allocation maps to the second channel according to a first index sequence of the received first dynamic resource allocation and the received second dynamic resource allocation maps to the second channel according to a second index sequence of the received second dynamic resource allocation.

11. The computer readable memory of claim 9, wherein the network node is a first network node, and the priority activity comprises at least one of measuring channel quality of the first channel with a second network node that is a neighbor to the first network node, reporting channel quality of the first channel with the second network node, and cell identification of a surrounding cell.

12. An apparatus comprising:
   at least one processor; and
   at least one memory storing program instructions;
   in which the at least one memory with the program instructions is configured with the at least one processor to cause the apparatus to at least:
   receive a first dynamic resource allocation on a first channel from a network node;
   send to the network node data according to the first resource allocation;
   during a time at which an acknowledgement or negative acknowledgement for the sent data is scheduled to be received on a second channel, to engage in a priority activity that takes priority over receiving the acknowledgement or negative acknowledgement; and
   thereafter to receive a second dynamic resource allocation on the first channel and determine the acknowledgement or negative acknowledgement for the sent data from the received second dynamic resource allocation.

13. The apparatus of claim 12, wherein the first channel is a physical downlink control channel and the second channel is a physical H-ARQ indicator channel.

14. The apparatus of claim 12, wherein the received second dynamic resource allocation further comprises an uplink resource allocation.

15. The apparatus of claim 14, wherein the acknowledgement comprises an allocation of a zero-valued resource in the received second dynamic resource allocation.

16. The apparatus of claim 12, wherein the at least one memory with the program instructions is configured with the at least one processor to further cause the apparatus to map the received first dynamic resource allocation to the second channel according to a first index sequence of the received first dynamic resource allocation and to map the received second dynamic resource allocation to the second channel according to a second index sequence of the received second dynamic resource allocation.

17. The apparatus of claim 16, wherein the at least one memory with the program instructions is configured with the at least one processor to further cause the apparatus to determine the acknowledgement or negative acknowledgement by mapping the received second dynamic resource allocation to the second channel using an offset of the second index sequence, the offset received at the receiver.

18. The apparatus of claim 12, wherein the network node is a first network node, and the priority activity comprises at least one of measuring channel quality of the first channel with a second network node that is a neighbor to the first network node, reporting channel quality of the first channel with the second network node, and cell identification of a surrounding cell.

19. The apparatus of claim 12, wherein the apparatus comprises a user equipment in an E-UTRAN network.

20. An apparatus comprising:
receiver means configured to receive a first dynamic resource allocation on a first channel from a network node;
transmit means configured to send to the network node data according to the first resource allocation;
processing means configured to control at least the receiver means, during a time at which an acknowledgement or negative acknowledgement for the sent data is scheduled to be received on a second channel, to engage in a priority activity that takes priority over receiving the acknowledgement or negative acknowledgement;
the receiver means further configured to receive a second dynamic resource allocation on the first channel and the processing means further configured to determine the acknowledgement or negative acknowledgement for the sent data from the received second dynamic resource allocation.

21. The apparatus of claim 20, wherein:
the receiver means comprises a receiver, the transmit means comprises a transmitter and the processing means comprises a digital data processor;
the first channel is a physical downlink control channel and the second channel is a physical H-ARQ indicator channel; and
the processor is configured to map the received first dynamic resource allocation to the second channel according to a first index sequence of the received first dynamic resource allocation and to map the received second dynamic resource allocation to the second channel according to a second index sequence of the received second dynamic resource allocation.

22. A method comprising:
sending to a user equipment a first dynamic resource allocation on a first channel;
receiving or not receiving data correctly from the user equipment according to the first resource allocation;
determining that, during a time at which an acknowledgement or negative acknowledgement for the respective received or not received data is scheduled to be sent to the user equipment on a second channel, the user equipment is engaging in a priority activity that takes priority over receiving the acknowledgement or negative acknowledgement;
sending to the user equipment a second dynamic resource allocation on the first channel that comprises information from which the user equipment may determine the acknowledgement or negative acknowledgement for the respective received or not received data.

23. The method of claim 22, wherein the first channel is a physical downlink control channel and the second channel is a physical H-ARQ indicator channel.

24. The method of claim 22, wherein the information comprises an allocation of a zero-valued radio resource in the second dynamic resource allocation.

25. The method of claim 22, wherein the first dynamic resource allocation maps to the second channel according to a first index sequence of the first dynamic resource allocation and the second dynamic resource allocation maps to the second channel according to a second index sequence of the second dynamic resource allocation.

26. The method of claim 25, further comprising sending an offset for use in mapping the second index sequence to the second dynamic resource allocation.

27. The method of claim 22, wherein the method is executed by a first network node, and the priority activity comprises at least one of measuring channel quality of the first channel with a second network node that is a neighbor to the first network node, reporting channel quality of the first channel with the second network node, and cell identification of a surrounding cell.

28. An apparatus comprising:
at least one processor; and
at least one memory storing program instructions;
in which the at least one memory with the program instructions is configured with the at least one processor to cause the apparatus to at least:
send to a user equipment a first dynamic resource allocation on a first channel;
correctly receive data from the user equipment according to the first resource allocation;
determine that, during a time at which an acknowledgement or negative acknowledgement for the respective correctly received or not received data is scheduled to be sent to the user equipment on a second channel, the user equipment is engaging in a priority activity that takes priority over receiving the acknowledgement or negative acknowledgement; and
thereafter send to the user equipment a second dynamic resource allocation on the first channel that comprises information from which the user equipment may determine the acknowledgement or negative acknowledgement for the respective correctly received or not received data according to the sent second dynamic resource allocation.

29. The apparatus of claim 28, wherein the first channel is a physical downlink control channel and the second channel is a physical H-ARQ indicator channel.

30. The apparatus of claim 28, wherein the second dynamic resource allocation further comprises an uplink resource allocation.

31. The apparatus of claim 28, wherein the information comprises an allocation of a zero-valued radio resource in the second dynamic resource allocation.

32. The apparatus of claim 28, wherein the at least one memory with the program instructions is configured with the at least one processor to further cause the apparatus to map the first dynamic resource allocation to the second channel according to a first index sequence of the first dynamic resource allocation and to map the second dynamic resource allocation to the second channel according to a second index sequence of the second dynamic resource allocation.

33. The apparatus of claim 32, wherein the at least one memory with the program instructions is configured with the at least one processor to further cause the apparatus to send to the user equipment an offset for use in mapping the second index sequence to the second dynamic resource allocation.

34. The apparatus of claim 25, wherein the apparatus comprises a first network node, and the priority activity comprises at least one of measuring channel quality of the channel with a second network node that is neighbor to the first network node, reporting channel quality of the channel with the second network node and cell identification of a surrounding cell.

* * * * *